United States Patent [19]

Okayasu

[11] Patent Number: 5,209,332
[45] Date of Patent: May 11, 1993

[54] CONTROL SYSTEM FOR A CLUTCH OF A MOTOR VEHICLE

[75] Inventor: Maki Okayasu, Tokyo, Japan

[73] Assignee: Fuji Jukogyo Kabushiki Kaisha, Tokyo, Japan

[21] Appl. No.: 750,293

[22] Filed: Aug. 27, 1991

[30] Foreign Application Priority Data

Sep. 6, 1990 [JP] Japan .................................. 2-236699

[51] Int. Cl.$^5$ .............................................. B60K 41/28
[52] U.S. Cl. ............................ 192/0.052; 192/0.076; 192/0.092; 192/3.56
[58] Field of Search ............... 192/0.052, 0.076, 0.092, 192/3.56, 21.5, 103 R; 364/424.1

[56] References Cited

U.S. PATENT DOCUMENTS

| | | | |
|---|---|---|---|
| 4,550,816 | 11/1985 | Sakakiyama | 192/0.052 |
| 4,730,711 | 3/1988 | Sakakiyama | 192/0.052 |
| 4,730,712 | 3/1988 | Ohkumo | 192/0.076 |
| 4,765,450 | 8/1988 | Kurihara et al. | 192/0.052 |
| 4,787,489 | 11/1988 | Miyawaki | 192/0.052 |

FOREIGN PATENT DOCUMENTS

61-220942 10/1986 Japan .
2088011 6/1982 United Kingdom ............... 192/21.5

*Primary Examiner*—Richard Lorence
*Attorney, Agent, or Firm*—Martin A. Farber

[57] ABSTRACT

When a drive range of a transmission is selected from a neutral range at a high engine racing speed, a racing start signal is produced. In response to the racing start signal, the electromagnetic clutch is engaged at a higher engaging rate than an ordinary engaging speed.

4 Claims, 7 Drawing Sheets

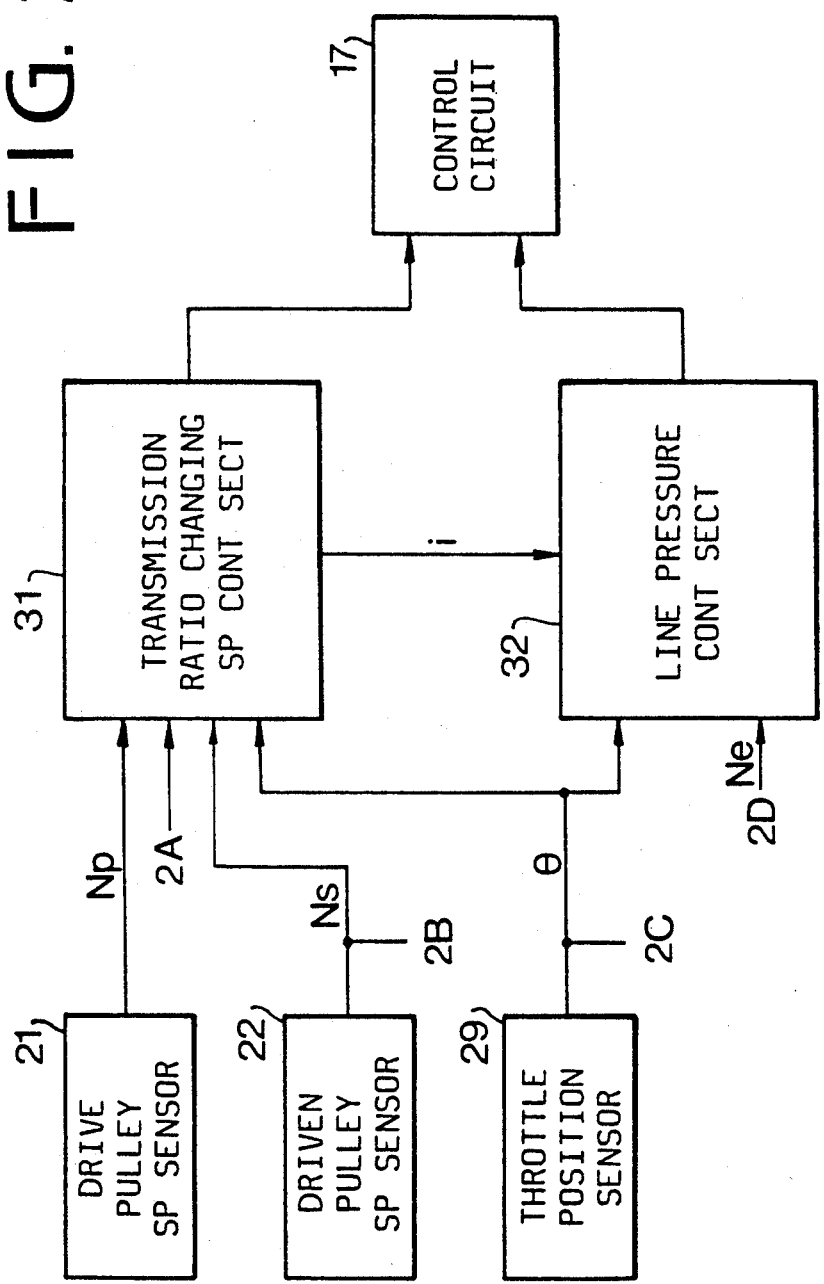

CONTROL SYSTEM FOR A CLUTCH OF A MOTOR VEHICLE

BACKGROUND OF THE INVENTION

The present invention relates to a control system for an automatic clutch such as an electromagnetic clutch for a transmission of a motor vehicle, and more particularly to a system for controlling the clutch when starting the motor vehicle.

Recently, an automatic clutch has been employed in an motor vehicle for smoothly transmitting power of an engine to the transmission. The automatic clutch of an automatic transmission is controlled by a control system to provide various operational modes for clutch torque. One of the modes is selected in accordance with a position of a selector lever and detected driving conditions. The clutch torque is increased with engine speed and time. At fast-idle of the engine during cold engine operation or during operation of an air conditioner, the clutch torque is corrected to slowly engage the clutch.

There is an automatic transmission having a racing start mode which is automatically selected in accordance with the selection of a drive range from a neutral range at high engine speed. Therefore, when the vehicle starts under the aforementioned condition, the racing start mode prevents a shock. More particularly, in the start mode, the engine races, and then the clutch is engaged to rapidly start the vehicle. If the clutch is slowly engaged in the same manner as an ordinary starting mode, the clutch torque at an initial stage of the starting is too small to start the vehicle, so that the engine speed is excessively increased, causing damage to the engine. Furthermore, the shock caused by inertia force at the high engine speed is exerted on the transmission, so that the power transmission system is subjected to an overload. In a continuously variable belt-drive transmission, the belt may slip with the overload. Therefore, it is necessary to properly control the clutch torque at the racing start.

Japanese Patent Application Laid-open 61-220942 discloses a clutch control system. The system comprises a first function system for determining clutch pressure of a clutch in accordance with functions of engine speed and accelerator pedal depressing degree, a second function system for determining the clutch pressure in accordance with functions of the accelerator pedal depressing degree and time, and a control unit for controlling the clutch pressure in accordance with the determined clutch pressure. In the racing start mode, the second function is selected based on high engine speed, thereby slowly increasing the clutch pressure in accordance with a function of time, thereby reducing the shock at the starting of the vehicle.

In the conventional system, however, since the increasing rate of the clutch pressure is regulated for reducing the shock at the engagement of the clutch, the engine speed is unnecessarily increased and hence the starting performance is low. In particular, in the case of the electromagnetic clutch, the response time of the clutch current to the clutch current control signal is comparatively long so that the increase of the clutch torque with an increase of the engine speed is delayed. Therefore, the engine speed is quickly increased and the clutch is engaged at a high engine speed. Thus, a large shock occurs with a large engine torque and a large inertia mass.

SUMMARY OF THE INVENTION

An object of the present invention is to provide a system for controlling the clutch which prevents the engine speed from unnecessarily increasing, thereby properly starting the vehicle in the racing start mode in accordance with a driver's intention.

According to the present invention, there is provided a system for controlling the clutch of a motor vehicle having an automatic clutch, a transmission and a selector lever for selecting a forward driving range or rearward driving range, the system comprising select operation detector means responsive to the selection of the selector lever from a parking position or a neutral position to a forward drive range position or the reverse drive range position to produce a corresponding drive range signal, speed detector means for detecting engine racing speed and for producing an engine speed signal when the engine racing speed is higher than a predetermined engine speed, means responsive to the drive range signal and the engine speed signal for producing a racing start signal, and clutch engaging means responsive to the racing start signal for engaging the clutch at a higher clutch engaging rate than an ordinary engaging rate which is designed in the automatic clutch.

In an aspect of the invention, the predetermined engine speed is a fast-idling speed.

Other objects and features of this invention will become understood from the following description with reference to the accompanying drawings.

BRIEF DESCRIPTION OF DRAWINGS

FIGS. 2a and 2b show a block diagram of a control unit according to the present invention;

DETAILED DESCRIPTION OF THE PREFERRED EMBODIMENT

Figure 1:
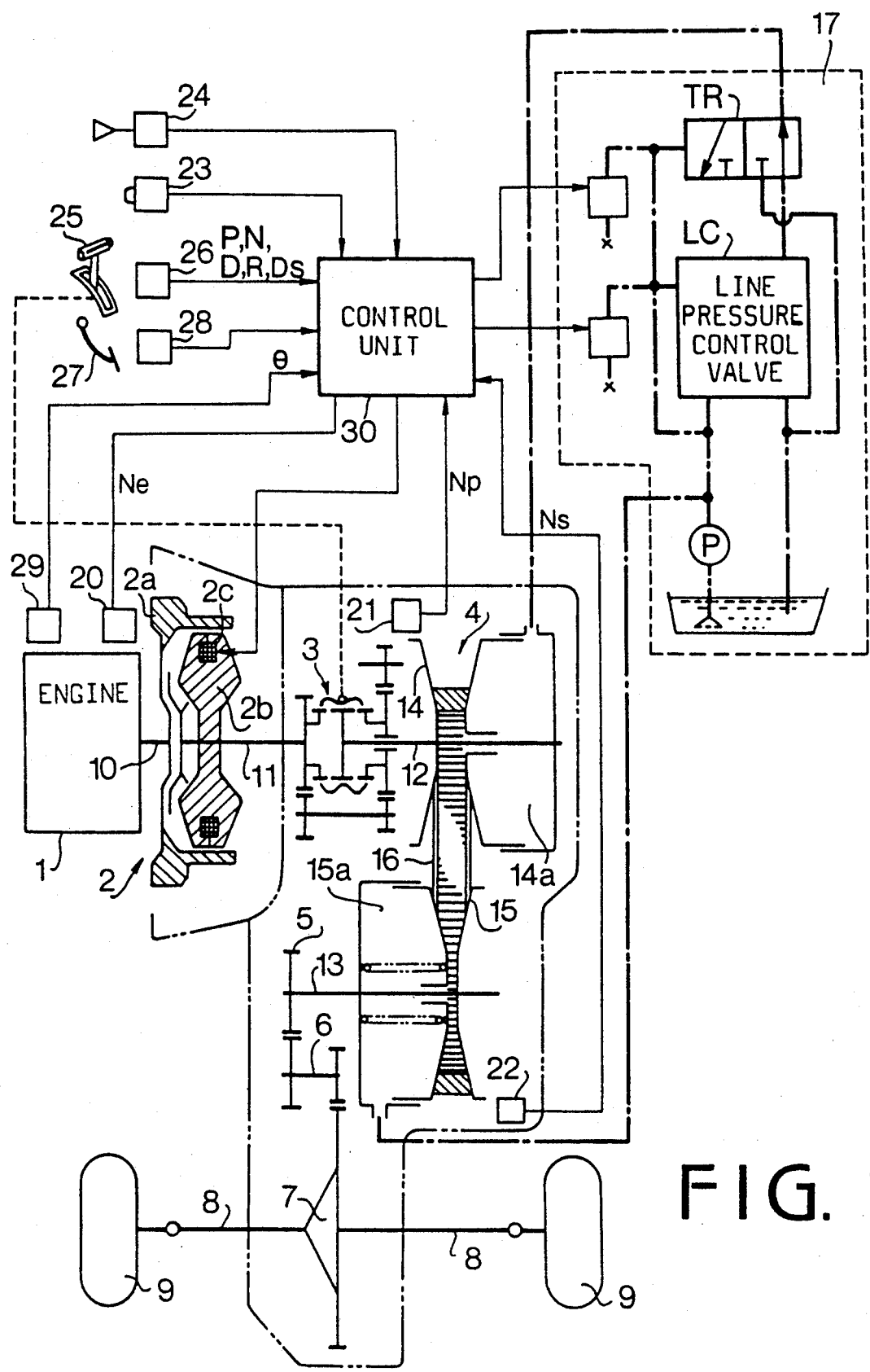
FIG. 1 is a schematic illustration of a system for controlling an electromagnetic clutch of a motor vehicle.

Referring to FIG. 1, showing a control system for an electromagnetic clutch for a continuously variable belt-drive transmission, a crankshaft 10 of an engine 1 is operatively connected to an electromagnetic powder clutch 2 for transmitting power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic power clutch 2 comprises an annular drive member 2a connected to the crankshaft 10 of the engine 1, a driven member 2b secured to an input shaft 11 of the transmission 4, and a magnetizing coil 2c provided in the driven member 2b. Powdered magnetic material is provided in a gap between the drive member 2a and the driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, a hub, and a sleeve for connecting the input shaft 11 and the main shaft 12. The transmission has a driving position (D-range), a high engine speed driving position (Ds-range), a neutral position (N-range), and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. The hydraulic cylinders 14a and 15a are communicated with a hydraulic control circuit 17. The cylinder 14a is supplied with pressurized oil by an oil pump P from an oil reservoir through a line pressure control valve LC and a transmission ratio control valve TR. The cylinder 15a is supplied with pressurized oil from the pump P through the line pressure control valve LC. The hydraulic control circuit 17 is responsive to vehicle speed, engine speed and throttle valve position for controlling the amount of oil supplied to the cylinders 14a and 15a. The pulleys 14 and 15 are operated by the compressive force of the cylinders 14a and 15a so that the running diameter of the belt 16 varies to infinitely change the transmission ratio of the transmission.

An electronic control system for the clutch 2 and the belt-drive transmission 4 has an engine speed sensor 20, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a parking position (P-range), the neutral position N, the drive positions D and Ds, and the reverse position R. An accelerator pedal switch 28 is provided for sensing the depression of an accelerator pedal 27, and a throttle position sensor 29 is provided.

Output signals of the sensors and pulses of the switches are applied to an electronic control unit 30 which produces a clutch current control signal for the clutch 2 and a control signal for controlling the transmission ratio (i) and a line pressure control signal for the control circuit 17.

Figure 2B:
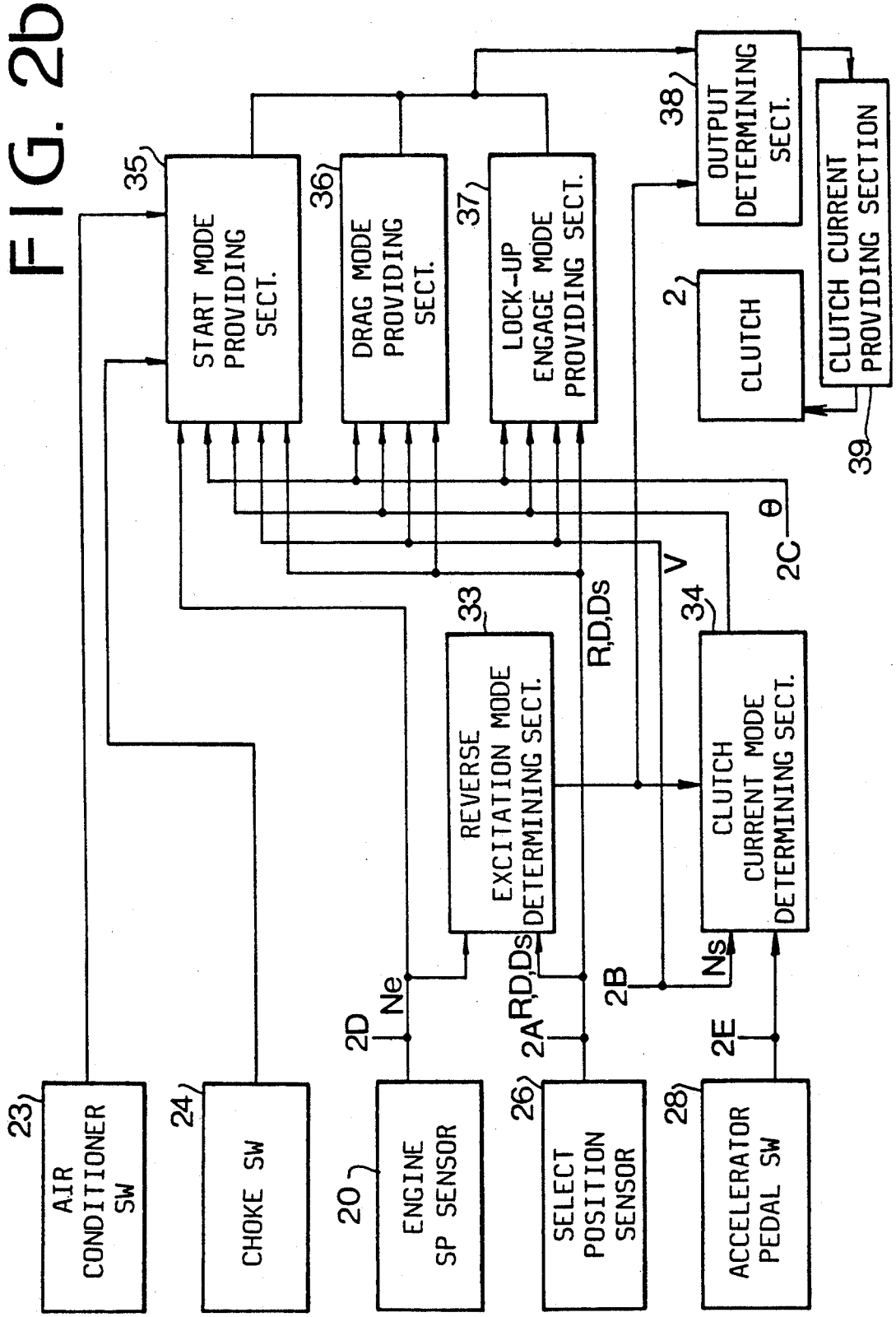

Referring to FIGS. 2a and 2b showing the control unit 30 of FIG. 1, a transmission ratio changing speed control section 31 is applied with a drive pulley speed signal $N_P$ of the sensor 21, a driven pulley speed signal $N_S$ of the sensor 22, a select position signal of the sensor 26, and a throttle position signal $\theta$ of the sensor 29 to produce the transmission ratio control signal dependent on a desired transmission ratio changing speed (rate) $di/dt$. A line pressure control section 32 is applied with an engine speed signal Ne of the sensor 20, the throttle position signal $\theta$ of the sensor 29, and an actual transmission ratio signal i ($N_S/N_P$) of the transmission ratio changing speed control section 31 to produce the line pressure control signal dependent on a desired line pressure. These control signals are applied to the control circuit 17 to control the transmission ratio and line pressure of the transmission 4.

A reverse excitation mode determining section 33 is applied with the engine speed signal Ne of the sensor 20 and drive position signals of the select position sensor 26. When the engine speed Ne is at an idling speed, or the selector lever 25 is at the neutral position (N-range) or the parking position (P-range), the reverse excitation mode determining section 33 produces a reverse excitation signal which is applied to an output determining section 38, so that a small reverse current flows in the coil 2C of the clutch 2 to release the clutch 2 completely.

A clutch current mode determining section 34 is applied with the signals from the reverse excitation mode determining section 33 and the accelerator pedal switch 28, and a vehicle speed signal V from the driven pulley speed sensor 22 for determining driving conditions such as starting mode to produce output signals. The output signals are applied to a start mode providing section 35, a drag mode providing section 36, and a clutch lock-up engage mode providing section 37.

The start mode providing section 35 decides the clutch current of starting characteristics dependent on the engine speed Ne at ordinary start or at closing of the choke switch 24 or the air conditioner switch 23. The starting characteristic is corrected by the signals, i.e., the throttle valve opening degree $\theta$, the vehicle speed V, and the driving positions of D-range, Ds-range and R-range.

The drag mode providing section 36 decides a small drag current when the accelerator pedal 27 is released at a low speed in each drive position for providing a drag torque to the clutch 2 for reducing clearance formed in the transmission and for smoothly starting the vehicle.

The clutch lock-up engage mode providing section 37 decides a lock-up current in response to the vehicle speed V and the throttle opening degree $\theta$ at each drive position for completely engaging the clutch 2. The output signal of the sections 35, 36 and 37 are applied to a clutch current providing section 39 through the output determining section 38 to control the clutch current.

Figure 3:
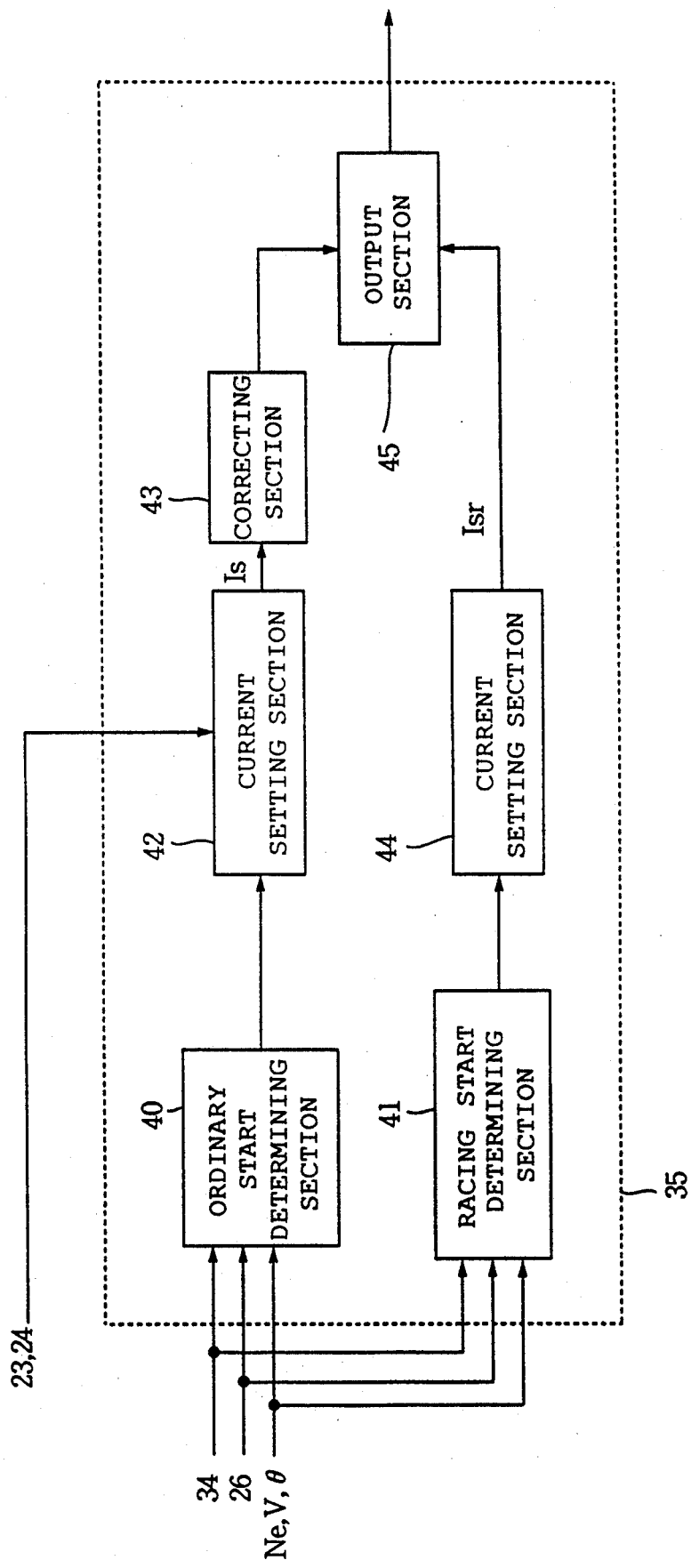
FIG. 3 is a block diagram showing a main part of the system.

The start mode providing section 35 has a system for controlling the electromagnetic clutch 2 in the racing start mode, which will be described hereinafter with reference to FIG. 3.

The start mode providing section 35 has an ordinary start determining section 40 and a racing start determining section 41 which are applied with the engine speed Ne, the vehicle speed V, the throttle valve opening decree $\theta$, and the output signals of the clutch current mode determining section 34 and the select position sensor 26, respectively.

Figure 4:
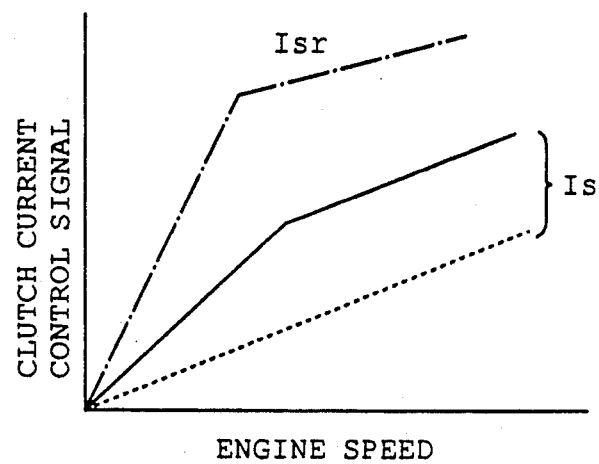
FIG. 4 is a graph showing clutch characteristics at an ordinary start and a racing start.

The ordinary start determining section 40 determines an ordinary starting mode of the vehicle when the engine speed Ne is low, the vehicle speed is lower than a predetermined speed, and the D, R or Ds-range is selected from the P-range or N-range, and thereafter, the throttle valve opening degree $\theta$ changes in accordance with the depression of the accelerator pedal. The section 40 produces an ordinary start signal which is applied to a clutch current setting section 42. In the current setting section 42, a clutch current control signal Is is determined in accordance with functions of the engine speed Ne, the time and other factors. The signal Is varies as shown by a solid line of FIG. 4. The clutch current control signal Is is applied to a correcting section 43 to which output signals from the air conditioner switch 23 and the choke switch 24 are applied. At fast-idle of the engine such as at cold engine operation or the operation of the air conditioner, the control signal Is is corrected as shown by a dotted line of FIG. 4.

When the throttle opening degree θ is large and the engine speed Ne is higher than the fast-idle speed and when the selector lever 25 is selectively moved to the driving position from the P or N position, the racing start determining section 41 determines the racing starting of the vehicle. The section 41 produces a racing start signal which is applied to a current setting section 44. In the current setting section 44, a clutch current control signal Isr for the racing start is determined in accordance with the functions of the engine speed Ne, the time, and other factors. The signal Isr varies as shown by the the dot-dash line of FIG. 4. In this state, since the engine speed Ne is high, an increasing rate k of the clutch current control signal Isr is determined to a large value at an initial stage compared with the control signal Is of the ordinary start and to a small value so as to gradually increase thereafter.

It is possible to determine the increasing rate k of the signal Isr as an increasing function of the engine speed Ne. Furthermore, the increasing rate k is changeable at each of the driving positions of D, R and Ds-ranges, and can be determined to have a curving characteristics.

The clutch current control signal Is or Isr is selectively produced through an output section 45.

The operation of the system will be described hereinafter with reference to the flowchart of FIG. 5 and the time chart of FIG. 6.

When the vehicle makes an ordinary start, the driving position such as D, R or Ds-range is selected at a low engine speed.

When the accelerator pedal is depressed, the clutch current determining section 34 applies a signal to the start mode providing section 35 in which the clutch current control signal Is is selected. The control signal Is is fed to the clutch current driving section 39 through the output determining section 38 so that a clutch current suitable for ordinarily starting the vehicle flows in the coil 2C of the clutch 2. When the vehicle speed V reaches a predetermined speed, a signal is supplied to the lock-up engage mode providing section 37 so that a large lock-up current for completely engaging the clutch flows to lock up the clutch 2.

Figure 5:
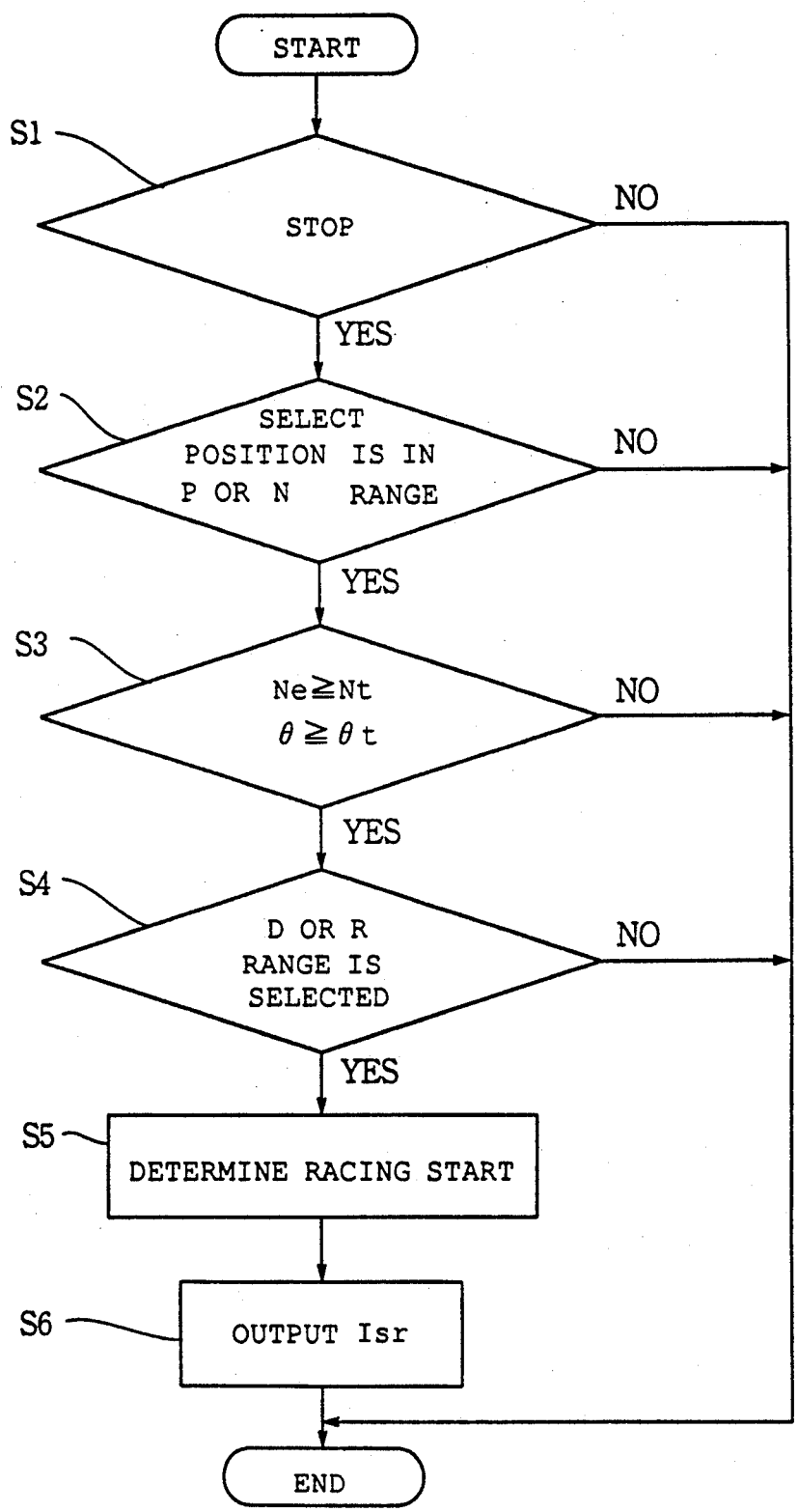
FIG. 5 is a flowchart showing the operation of the system at the racing start.

When the vehicle makes the racing start, the operation described in the flowchart of FIG. 5 is executed.

At a step S1, it is determined that the vehicle is at a stop. At a step S2, the P or N-range is determined. At a step S3, it is determined that the throttle opening degree θ and the engine speed Ne are larger and higher than set values θt and Nt, respectively. The program goes to a step S4 in which the selection of the D, R or Ds-range is determined. At a step S5, the racing start is determined. The clutch current control signal Isr having a large increasing rate k is output at a step S6.

Figure 6:
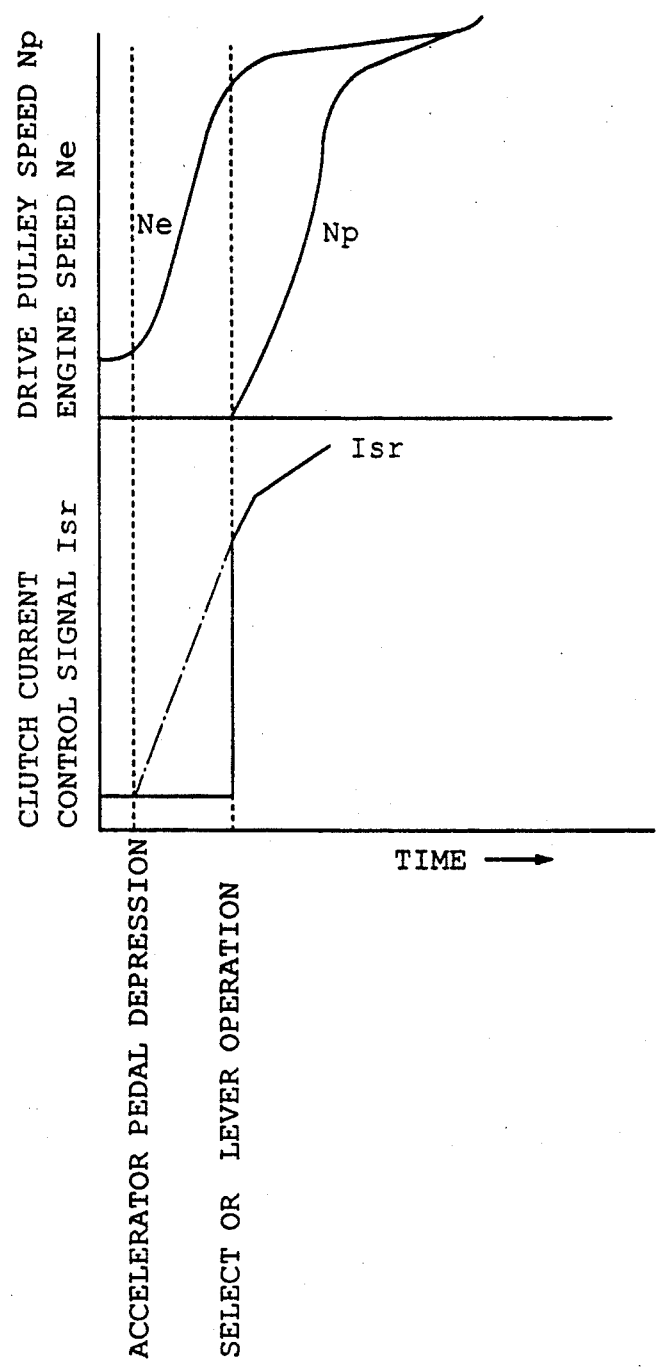
FIG. 6 is graphs showing a time chart of the operation of FIG. 5.

As shown in FIG. 6, the clutch current control signal Isr is rapidly increased to sufficiently increase the clutch current with a slight delay, and the clutch torque rapidly increases accordingly. Thus, the drive pulley speed Np is increased, so that the engine speed Ne is suppressed to coincide with the drive pulley speed Np at an early stage, thereby preventing the engine speed Ne from excessively increasing.

In the present invention, a dry or wet type friction clutch can also be used. In such a case, a control signal for controlling hydraulic oil pressure for the clutch is controlled in the same manner as described above.

From the foregoing, it will be understood that the present invention provides a system where the increasing rate of the clutch torque in the racing start mode is properly increased in accordance with high engine speed so that the clutch engaging characteristic is improved. Therefore, it is possible to prevent an excessive increase of the engine speed, large shock caused by inertia force, and overload on the transmission.

The starting characteristics can be easily controlled in accordance with the increasing rate of the clutch torque which is function of the engine speed or the time.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for an electromagnetic clutch for a motor vehicle having an engine connected directly to said clutch, a transmission for transmitting power of said engine from an output member of said clutch to axles of vehicle driving wheels, a throttle position sensor for detecting a throttle opening degree of a throttle valve mounted on said engine and for producing a throttle position signal, an output member speed sensor for detecting speed of said axles and for producing an output member speed signal, an engine speed sensor for detecting engine speed and for generating an engine speed signal, a select position sensor for sensing a position of a selector lever for selecting ranges of the transmission and for producing a position signal, and an accelerator pedal switch for detecting depression degree of an accelerator pedal and for generating an accelerator signal, the improvement of the system which comprises:

reverse mode deciding means responsive to said position signal and said engine speed signal for deciding a reverse excitation mode of said clutch and for producing a reverse mode signal;

clutch current mode deciding means responsive to said reverse mode signal, said output member speed signal and said accelerator signal for deciding a clutch current mode and for generating a clutch current mode signal;

ordinary start deciding means responsive to said clutch current mode signal, said position signal, said throttle position signal, said engine speed signal and said output member speed signal for deciding an ordinary start mode by comparing an actual starting condition with a standard condition stored in a table of a memory and for producing an ordinary start signal; and racing start deciding means responsive to said clutch current mode signal, said position signal, said throttle position signal, said engine speed signal and said output member speed signal for judging a racing start condition by comparing said actual starting condition with a standard racing condition stored in said table so as to rapidly increase clutch current after deciding said racing start condition for preventing said engine speed from excessively increasing.

2. The control system according to claim 1, wherein the racing start is determined by the throttle opening degree, engine speed higher than fast-idle speed, and changing of the selector level from P or N positions to drive position.

3. The system according to claim 1, wherein said transmission is a continuously variable belt-drive transmission.

4. The system according to claim 3, wherein said continuously variable belt-drive transmission has a primary pulley with a hydraulically shiftable disc and a primary hydraulic cylinder for shifting said disc, a secondary pulley with a hydraulically shiftable disc and a secondary hydraulic cylinder for operating said disc of said secondary pulley, a belt engaged with both pulleys, a hydraulic circuit for supplying oil from a pump to said cylinders, a line pressure control valve for controlling a primary pressure of said oil in said primary cylinder, a transmission ratio control valve for controlling a secondary pressure of said oil in said secondary cylinder, speed sensors for detecting pulley speeds of said primary and secondary pulleys and for producing pulley speed signals, line pressure control means responsive to said engine speed signal for controlling said primary pressure, transmission ratio control means responsive to said pulley speed signals and to said throttle position signal for controlling said secondary pressure.

* * * * *